United States Patent [19]
DePorter et al.

[11] Patent Number: 6,096,828
[45] Date of Patent: Aug. 1, 2000

[54] CONJUGATED DIENE/MONOVINYLARENE BLOCK COPOLYMERS, METHODS FOR PREPARING SAME, AND POLYMER BLENDS

[75] Inventors: Craig D. DePorter, Seabrook, Tex.; Nathan E. Stacy; George A. Moczygemba, both of Bartlesville, Okla.

[73] Assignee: Phillips Petroleum Company, Bartlesville, Okla.

[21] Appl. No.: 08/521,335

[22] Filed: Aug. 29, 1995

[51] Int. Cl.[7] .................................................. C08F 297/04
[52] U.S. Cl. .............................................. 525/98; 525/314
[58] Field of Search ....................... 525/314, 98

[56] References Cited

U.S. PATENT DOCUMENTS

| | | | |
|---|---|---|---|
| 4,089,913 | 5/1978 | Tamotsu et al. | |
| 4,631,314 | 12/1986 | Tung et al. | 525/314 |
| 4,704,434 | 11/1987 | Kitchen et al. | 525/250 |
| 4,925,899 | 5/1990 | Rendina | 525/314 |
| 5,130,377 | 7/1992 | Trepka et al. | 525/314 |
| 5,227,419 | 7/1993 | Moczygemba et al. | 524/128 |
| 5,256,836 | 10/1993 | Trepka et al. | 525/314 |
| 5,272,207 | 12/1993 | Hall et al. | 525/89 |
| 5,290,875 | 3/1994 | Moczygemba et al. | 525/314 |
| 5,319,033 | 6/1994 | Trepka | 525/314 |
| 5,399,628 | 3/1995 | Moczygemba et al. | 525/314 |
| 5,436,298 | 7/1995 | Moczygemba | 525/314 |
| 5,438,103 | 8/1995 | DePorter | 525/314 |

FOREIGN PATENT DOCUMENTS

| | | |
|---|---|---|
| 0553689 | 12/1993 | European Pat. Off. . |
| 2257618 | 5/1978 | France . |

OTHER PUBLICATIONS

Chemical Abstracts, vol. 104, No. 14, 1986, Abstract No. 111041z, p. 59 (1986).

Derwent Publications Ltd., London, GB; AN 87–159661; XP002016522.

*Primary Examiner*—Jeffrey C. Mullis
*Attorney, Agent, or Firm*—Richmond, Hitchcock, Fish & Dollar

[57] ABSTRACT

A block copolymer comprising at least three consecutive conjugated diene/monovinylarene tapered blocks is provided. Other aspects of this invention include a polymerization process for preparing the block copolymer and polymer blends comprising the block copolymer. The block copolymer and polymer blends exhibit excellent optical and mechanical properties.

9 Claims, No Drawings

CONJUGATED DIENE/MONOVINYLARENE BLOCK COPOLYMERS, METHODS FOR PREPARING SAME, AND POLYMER BLENDS

This invention relates to conjugated diene/monovinylarene block copolymers, methods of preparing same and polymer blends comprising such copolymers.

BACKGROUND

Copolymers of conjugated diene/monovinylarene are known and useful for a variety of purposes. Of particular interest are polymers that can be formed into colorless, transparent articles having good physical properties, such as impact resistance. Such articles are useful in toys, window pieces, beverage containers, and packaging such as blister packaging.

The polymers should also exhibit sufficient thermal stability to be suitable for use with conventional injection molding equipment. For many applications copolymer blends containing high amounts of styrene are required. Such polymers are generally prepared by blending certain monovinylarene-conjugated diene copolymers with styrene polymers. However such blends often contain an undesirable haze and blue coloration. It would therefore be desirable to develop polymers and polymer blends having a combination of low blueness, good clarity, hardness, stiffness, and toughness.

SUMMARY OF THE INVENTION

It is an object of this invention to provide a polymer useful for preparing blends having good optical clarity.

It is another object of this invention to provide a polymer useful for preparing blends having low blueness.

It is another object of this invention to provide a process for preparing such polymers having good optical and mechanical properties.

In accordance with this invention a block copolymer comprising at least three consecutive conjugated diene/monovinylarene tapered blocks is provided. As used herein, consecutive means three sequential tapered blocks with no intervening homopolymer blocks. The tapered blocks contain a mixture of monovinylarene and conjugated diene.

In accordance with other aspects of this invention, a polymerization process for preparing the block copolymer and polymer blends comprising the block copolymer are provided.

DETAILED DESCRIPTION OF THE INVENTION

The basic starting materials and polymerization conditions for preparing conjugated diene/monovinylarene block copolymer are disclosed in U.S. Pat. Nos. 4,091,053; 4,584,346; 4,704,434; 4,704,435; and 5,227,419; the disclosures of which are hereby incorporated by reference.

Suitable conjugated dienes which can be used in the block copolymers include those having 4 to 12 carbon atoms per molecule, with those having 4 to 8 carbon atoms preferred. Examples of such suitable compounds include 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. The preferred dienes are 1,3-butadiene and isoprene, more preferably 1,3-butadiene.

Suitable monovinylarene compounds which can be used in the block copolymers include those having 8 to 18 carbon atoms per molecule, preferably 8 to 12 carbon atoms. Examples of such suitable compounds include styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. Styrene is the preferred monovinylarene compound.

The relative amount of conjugated diene and monovinylarene in the block copolymer can vary broadly depending on the particular characteristics desired. Generally, the conjugated diene/monovinylarene block copolymer will contain monovinylarene monomer in an amount in the range of from about 55 weight percent to about 95 weight percent based on the total weight of the final block copolymer, preferably in the range of from about 60 weight percent to about 95 weight percent, and more preferably in the range of from 65 weight percent to 90 weight percent.

Generally the conjugated diene monomer will be present in the final block copolymer in an amount in the range of from about 45 weight percent to about 5 weight percent based on the total weight of the final block copolymer, preferably in the range of from about 40 weight percent to about 5 weight percent, and more preferably in the range of from 35 weight percent to 10 weight percent.

The inventive polymer contains at least three consecutive conjugated diene/monovinylarene tapered blocks, which are incorporated sequentially into the block copolymer with no intervening homopolymer blocks.

The amount of each monomer in the tapered block can vary broadly depending on the particular characteristics desired. Generally monovinylarene will be present in each tapered block in an amount in the range of from about one weight percent to about 20 weight percent based on the total weight of the final block copolymer, preferably from about 2 weight percent to about 15 weight percent.

Generally the conjugated diene will be present in each tapered block in an amount in the range of from about one weight percent to about 15 weight percent based on the total weight of the final block copolymer, preferably from about 2 weight percent to about 12 weight percent. It is especially preferred that all conjugated diene monomer present in the final block copolymer be incorporated into the tapered blocks.

The relative amount of each monomer in the tapered block can also vary broadly depending on the particular characteristics desired. Generally the conjugated diene will be present in each tapered block in an amount in the range of from about 0.1 parts to about 10 parts per part monovinylarene in the tapered block, preferably from about 0.2 parts to about 5 parts per part monovinylarene.

The monomer and monomer mixtures are copolymerized sequentially in the presence of an initiator. The initiators can be any of the organomonoalkali metal compounds known for such purposes. Preferably employed are compounds of the formula RM, wherein R is an alkyl, cycloalkyl, or aryl radical containing 4 to 8 carbon atoms, more preferably R is an alkyl radical. M is an alkali metal, preferably lithium. The presently preferred initiator is n-butyl lithium.

The amount of initiator employed depends upon the desired polymer or incremental block molecular weight, as is known in the art, and is readily determinable, making due allowance for traces of poisons in the feed streams. Generally the initiator will be present in an amount in the range of from about 0.01 phm (parts by weight per hundred parts by weight of total monomer) to about 1.0 phm, preferably about 0.01 phm to about 0.5 phm, and more preferably from 0.01 phm to 0.2 phm.

Small amounts of polar organic compounds, such as ethers, thioethers, and tertiary amines can be employed in the hydrocarbon diluent to improve the effectiveness of the initiator and to randomize at least part of the monovinylarene monomer in a mixed monomer charge. Tetrahydrofuran is currently preferred. When employed, the polar organic compound is present in an amount sufficient to improve the effectiveness of the initiator. For example, when employing tetrahydrofuran to improve the effectiveness of the initiator, the tetrahydrofuran is generally present in an amount in the range of from about 0.01 to about 1.0 phm, preferably from about 0.02 to about 1.0 phm.5

The polymerization process is carried out in a hydrocarbon diluent at any suitable temperature in the range of from about −100° C. to about 150° C., preferably from 0° to 150° C., at pressures sufficient to maintain the reaction mixture substantially in the liquid phase. Preferred hydrocarbon diluents include linear or cycloparaffins or mixtures thereof. Typical examples include pentane, hexane, octane, cyclopentane, cyclohexane, and mixtures thereof. Cyclohexane is presently preferred. The polymerization is carried out in a substantial absence of oxygen and water, preferably under an inert gas atmosphere.

Each monomer charge or monomer mixture charge is polymerized under solution polymerization conditions such that the polymerization of each monomer charge or monomer mixture charge is substantially complete before charging a subsequent charge.

Typical initiator, monomer and monomer mixture charge sequences include, but are not limited to the following:

Mode A
(a) monovinylarene monomer and initiator,
(b) monovinylarene monomer and initiator,
(c) conjugated diene/monovinylarene monomer mixture,
(d) conjugated diene/monovinylarene monomer mixture,
(e) conjugated diene/monovinylarene monomer mixture, and
(f) coupling agent;

Mode B
(a) monovinylarene monomer and initiator,
(b) monovinylarene monomer and initiator,
(c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture, and
(g) coupling agent;

Mode C
(a) monovinylarene monomer and initiator,
(b) monovinylarene monomer and initiator,
(c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture,
(g) conjugated diene/monovinylarene monomer mixture, and
(h) coupling agent.

Mode D
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture, and
(e) coupling agent;

Mode E
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture,
(e) conjugated diene/monovinylarene monomer mixture, and
(f) coupling agent;

Mode F
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture, and
(g) coupling agent.

The monomer mixture can be premixed and charged as a mixture or the monomers can be charged simultaneously. In step (a) the initiator can be added before or after the monovinylarene monomer charge. In large scale operations it may be desirable to add the monovinylarene monomer before adding the initiator in step (a). In subsequent steps containing initiator, the initiator should be added prior to the monomer or monomer mixture.

Prior to coupling, typical polymer chains prepared by the above described sequential polymerizations include the following:

Mode A
$S_1$-$S_2$-$B_1$/$S_3$-$B_2$/$S_4$-$B_3$/$S_5$-Li
$S_2$-$B_1$/$S_3$-$B_2$/$S_4$-$B_3$/$S_5$-Li Mode B
$S_1$-$S_2$-$B_1$/$S_3$-$B_2$/$S_4$-$B_3$/$S_5$-$B_4$/$S_6$-Li
$S_2$-$B_1$/$S_3$-$B_2$/$S_4$-$B_3$/$S_5$-$B_4$/$S_6$-Li Mode C
$S_1$-$S_2$-$B_1$/$S_3$-$B_2$/$S_4$-$B_3$/$S_5$-$B_4$/$S_6$-$B_5$/$S_7$-Li
$S_2$-$B_1$/$S_3$-$B_2$/$S_4$-$B_3$/$S_5$-$B_4$/$S_6$-$B_5$/$S_7$-Li Mode D
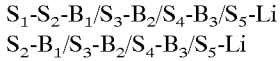
$S_1$-$B_1$/$S_2$-$B_2$/$S_3$-$B_3$/$S_4$-Li
$B_1$/$S_2$-$B_2$/$S_3$-$B_3$/$S_4$-Li Mode E
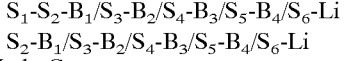
$S_1$-$B_1$/$S_2$-$B_2$/$S_3$-$B_3$/$S_4$-$B_4$/$S_5$-Li
$B_1$/$S_2$-$B_2$/$S_3$-$B_3$/$S_4$-$B_4$/$S_5$-Li Mode F
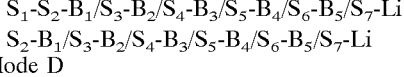
$S_1$-$B_1$/$S_2$-$B_2$/$S_3$-$B_3$/$S_4$-$B_4$1$S_5$-$B_5$1$S_6$-Li
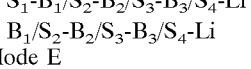
$B_1$/$S_2$-$B_2$/$S_3$-$B_3$/$S_4$-$B_4$/$S_5$-$B_5$/$S_6$-Li
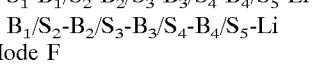

where S is a monovinylarene block, B/S is a tapered block containing a mixture of monovinylarene and conjugated diene, and Li is residue from a monoalkali metal initiator.

The coupling agent is added after polymerization is complete. Suitable coupling agents include the di- or multivinylarene compounds, di- or multiepoxides, di- or multiisocyanates, di- or multiimines, di- or multialdehydes, di- or multiketones, alkoxytin compounds, di- or multihalides, particularly silicon halides and halosilanes, mono-, di-, or multianhydrides, di-, or multiesters, preferably the esters of monoalcohols with polycarboxylic acids, diesters which are esters of monohydric alcohols with dicarboxylic acids, diesters which are esters of monobasic acids with polyalcohols such as glycerol, and the like, and mixtures of two or more such compounds.

Useful multifunctional coupling agents include epoxidized vegetable oils such as epoxidized soybean oil, epoxidized linseed oil and the like or mixtures thereof. The presently preferred coupling agent is epoxidized vegetable oil. Presently preferred is epoxidized soybean oil.

Any effective amount of the coupling agent can be employed. While the amount is not believed to be critical, generally a stoichiometric amount relative to the active polymer alkali metal tends to promote maximum coupling. However, more or less than stoichiometric amounts can be used for varying coupling efficiency where desired for particular products. Typically the total amount of coupling agent employed in the polymerization is in the range of from about 0.1 phm to about 20 phm, preferably from about 0.1 phm to about 5 phm, and more preferably 0.1 phm to 2 phm.

Following completion of the coupling reaction, the polymerization reaction mixture can be treated with a terminating agent such as water, alcohol, phenols or linear saturated aliphatic mono-dicarboxylic acids to remove alkali metal from the block copolymer and for color control. The preferred terminating agent is water and carbon dioxide.

The polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

The block copolymer can be recovered and worked into the desired shape, such as by milling, extrusion, or injection molding. The block copolymer can also contain additives such as antioxidants, antiblocking agents, release agents, fillers, extenders, and dyes, and the like as long as the amounts and types do not interfere with the objectives of this invention.

In another embodiment of this invention, the block copolymers are blended with other styrenic polymers such as polystyrene, acrylonitrile-butadiene-styrene copolymers, and styrene-acrylonitrile copolymers.

The styrenic polymers are usually (a) homopolymers of styrene; or (b) copolymers of styrene as a major component with a minor amount of any other copolymerizable monovinylarene compound other than styrene, such as alpha-methylstyrene, vinyltoluene or para-tert-butyl styrene. A minor amount of other monomers such as methyl acrylate, methyl methacrylate, acrylonitrile and the like can be copolymerized with the styrene. Blends comprising the inventive block copolymers and polystyrene exhibit a combination of desirable characteristics and they are preferred.

The styrenic polymers can be prepared by any method known in the art. The styrenic polymers are commonly prepared by heating styrene and any comonomer at temperatures in the range of 100° C. to 200° C. and under pressure sufficient to polymerize the monomers. The polymerization can also be carried out at lower temperatures by the addition of free radical generating peroxide catalysts such as benzoyl peroxide, acetyl peroxide, di-t-butyl peroxide and the like. Alternatively, the polymerization can be carried out in suspension to yield a dry powder or in emulsion, usually resulting in a latex of polystyrene which can be coagulated to yield the solid powdery polystyrene. The polymerization can also be carried out in solution with precipitation of the product. Solvent can be removed by standard techniques such as steam stripping or solvent evaporation.

High impact polystyrene can also be employed in blends with the inventive block copolymers. High impact polystyrenes can be prepared by polymerizing styrene in the presence of elastomer, typically polybutadiene rubber.

The relative amounts of block copolymer and styrenic polymer employed in preparing the polymer blend can vary broadly depending on the desired characteristics of the final polymer blend. Typical polymer blends contain block copolymer in an amount in the range of from about 5 weight percent to about 95 weight percent based on the total weight of the final polymer blend, preferably from about 10 weight percent to about 90 weight percent, and more preferably from about 20 weight percent to about 80 weight percent based on the total weight of the final polymer blend.

The styrenic polymer will be present in an amount in the range of from about 5 weight percent to about 95 weight percent based on the total weight of the final polymer blend, preferably from about 10 weight percent to about 90 weight percent, and more preferably from about 20 weight percent to about 80 weight percent based on the total weight of the final polymer blend.

The polymer blends described above exhibit a combination of desirable characteristics. The polymer blends exhibit haze of less than about 15 percent, preferably less than about 10 percent measured according to ASTM 1003, using test specimens of 50 mil thickness and an instrument such as a Gardner Hazemeter. When using test specimens of 15 mil thickness and an instrument such as a HunterLab ColorQuest, preferably the haze will be less than 5 percent.

The polymer blends preferably exhibit a Notched Izod Impact Strength of greater than about 0.2 ft·lb/inch, preferably greater than 0.3 ft·lb/inch measured according to ASTM D-256.

The polymer blends also exhibit low blueness, preferably having an absolute number for blueness of less than 20, measured with a HunterLab D25 M Optical Sensor using three stacked injection molded (350° F./30 tons/2 minutes) resin disks of 50 mil thickness measured against a calibrated black background. Positive numbers represent yellow and negative numbers represent blue. When employing 15 mil thick extruded sheet (400 ° F./20 mil nominal die gap), the absolute number for blueness will preferably be less than 15.

Blending can be accomplished by any method known in the art including melt blending and solution blending. Preferably the polymers are melt blended employing any desired means such as a Banbury mixer, a hot roll, or an extruder. More preferably the polymers are melt blended employing extruder blending techniques. Single or twin screw extruders can be utilized. The polymers and any other ingredients or additives can be dry blended prior to the melt blending.

The blending conditions depend upon the blending technique and polymers employed. If an initial dry blending of the polymer is employed, the dry blending conditions may include temperatures from room temperature up to just under the melting temperature of the polymer, and blending times in the range of a few seconds to hours, e.g. 2 seconds to 30 minutes.

During the melt blending, the temperature at which the polymers are combined in the blender will generally be in the range between the highest melting point of the polymers employed and up to about 100IC above such melting point.

The time required for the melt blending can vary broadly and depends on the method of blending employed. The time required is the time sufficient to thoroughly mix the components. Generally, the individual polymers are blended for a time of about 10 seconds to about 15 minutes.

The polymer blends can contain additives such as stabilizers, anti-oxidants, anti-blocking agents, mold release agents, dyes, pigments, and flame retardants, as well as fillers and reinforcing agents, such as glass fibers, as long as the amounts and types do not interfere with the objectives of this invention.

The block copolymers and polymer blends prepared according to the invention are useful for the production of articles prepared by milling, extrusion, blow molding, or injection molding.

The following examples are presented to further illustrate the invention and are not meant to limit the scope thereby.

EXAMPLE

The following example demonstrates the preparation of block copolymers and the combination of clarity and mechanical properties of various polymer blends.

Styrene/butadiene block copolymer (SB) was prepared employing a sequential solution polymerization under nitrogen. Polymerization runs were carried out in a stirred, 100 gallon carbon steel reactor with internal cooling coils employing essentially anhydrous reactants and conditions.

Lines were flushed with 0.5 kg cyclohexane following each charge. Polymerization was allowed to continue to completion after each monomer or monomer mixture charge. Polymerization temperature ranged from about 38° to about 120° C. and pressure ranged from about 2 psig to about 60 psig. Total monomer weight was about 90 kg. The sequence of charges of tetrahydrofuran (THF), styrene (S), n-butyllithium initiator (i), butadiene/styrene mixture (B/S), and coupling agent (CA) was as follows.

Block Copolymer A1

0.5 THF, $0.05i_1$, $30S_1$, $0.05i_2$, $20S_2$, $(5B_1/10S_3)$, $(10B_2/10S_4)$, $(10B_3/55_5)$, CA. (amounts in parts/100 parts monomer)

Block Copolymer A2

0.1 THF, $0.05i_1$, $30S_1$, $0.05i_2$, $20S_2$, $(5B_1/10S_3)$, $(10B_2/10S_4)$, $(10B_3/5S_5)$, CA. (amounts in parts/100 parts monomer)

Following completion of the sequential polymerizations, Vikoflex 7170, (a coupling agent comprising epoxidized soybean oil sold by Viking Chemical Co.) was charged to the reactor. After completion of the coupling reaction, the reaction was terminated by adding $CO_2$ and 0.2 phm water. The styrene/butadiene block copolymers were stabilized with 0.25 phr (parts per hundred resin) Irganox 1076 and 1.0 phr tris(nonylphenyl) phosphite.

The block copolymers A1 and A2 exhibited melt flows of 7.2 and 6.5 g/10 min. respectively measured according to ASTM D-1238, condition G.

Polystyrene (PS), Novacor 555 GPPS, available from Novacor Plastics Division was blended with S/B block copolymer at 60:40 and 50:50 block copolymer:polystyrene weight ratios.

The results are summarized in Table 1. Blueness, tristumulus value "b", a measure of blue and yellow color, was measured with a HunterLab D25 M Optical Sensor using 15 mil extruded sheet (400 F.°/20 mil nominal die gap). Measurements were against a calibrated black background. A positive number represents yellow and a negative number represents blue.

In the following table:
  Copolymer is the styrene/butadiene block copolymer employed.
  CP/PS is the ratio of block copolymer to polystyrene employed in the polymer blend.
  Haze in percent was measured according to ASTM 1003 on 15 mil sheets using a HunterLab ColorQuest instrument.
  Blueness was measured as described above.

TABLE 1

| Blend | Copolymer | CP/PS | Haze % | Blueness |
|-------|-----------|-------|--------|----------|
| 101   | A1        | 60/40 | 2.49   | −10.0    |
| 102   | A1        | 50/50 | 2.92   | −12.2    |
| 103   | A2        | 60/40 | 2.53   | −9.8     |
| 104   | A2        | 50/50 | 2.86   | −10.4    |

The results in Table 1 demonstrate that polymer blends employing a block copolymer containing three tapered blocks exhibit a combination of good clarity and low blueness. The polymer blends also exhibited good impact toughness and ductility.

That which is claimed is:

1. A coupled conjugated diene/monovinylarene block copolymer comprising at least three consecutive conjugated diene/monovinylarene tapered blocks:
   wherein the monovinylarene contains from 8 to 18 carbon atoms; and
   wherein the conjugated diene contains from 4 to 12 carbon atoms.

2. A block copolymer according to claim 1 wherein the conjugated diene is butadiene.

3. A block copolymer according to claim 2 wherein the monovinylarene is styrene.

4. A block copolymer according to claim 1 wherein the monovinylarene is present in an amount in the range of from about 55 weight percent to about 95 weight percent based on the total weight of the final block copolymer and the conjugated diene is present in an amount in the range of from about 5 weight percent to about 45 weight percent based on the total weight of the final block copolymer.

5. A block copolymer according to claim 4 wherein the monovinylarene is present in an amount in the range of from about 60 weight percent to about 95 weight percent based on the total weight of the final block copolymer and the conjugated diene is present in an amount in the range of from about 5 weight percent to about 40 weight percent based on the total weight of the final block copolymer.

6. A block copolymer according to claim 5 wherein the monovinylarene is present in an amount in the range of from about 65 weight percent to about 90 weight percent based on the total weight of the final block copolymer and the conjugated diene is present in an amount in the range of from about 10 weight percent to about 35 weight percent based on the total weight of the final block copolymer.

7. A block copolymer according to claim 6 wherein each individual tapered block contains the monovinylarene in an amount in the range of from about one weight percent to about 20 weight percent based on the total weight of the final block copolymer and the conjugated diene is present in an amount in the range of from about one weight percent to about 15 weight percent based on the total weight of the final block copolymer.

8. A block copolymer according to claim 7 wherein each individual tapered block contains the monovinylarene in an amount in the range of from about one weight percent to about 15 weight percent based on the total weight of the final block copolymer and the conjugated diene in an amount in the range of from about one weight percent to about 12 weight percent based on the total weight of the final block copolymer.

9. A block copolymer according to claim 1 which is prepared by coupling the following polymer chains:

$S_1$-$S_2$-$B_1$/$S_3$-$B_2$/$S_4$-$B_3$/$S_5$-Li $S_2$-$B_1$/$S_3$-$B_2$/$S_4$-$B_3$/$S_5$-Li wherein S represents monovinylarene blocks, B/S represents tapered blocks of conjugated diene/monovinylarene and Li is residue from a monoalkali metal initiator.

* * * * *